W. W. DOOLITTLE.
GATE VALVE.
APPLICATION FILED AUG. 18, 1908.

925,880.

Patented June 22, 1909.

WITNESSES
A. Y. Andrews.

INVENTOR
William W. Doolittle
by atty's
Synnestvedt & Carpenter

UNITED STATES PATENT OFFICE.

WILLIAM W. DOOLITTLE, OF EVANSTON, ILLINOIS, ASSIGNOR TO CRANE COMPANY, OF CHICAGO, ILLINOIS, A CORPORATION OF ILLINOIS.

GATE-VALVE.

No. 925,880.  Specification of Letters Patent.  Patented June 22, 1909.

Application filed August 18, 1908. Serial No. 449,048.

*To all whom it may concern:*

Be it known that I, WILLIAM W. DOOLITTLE, a citizen of the United States, residing at Evanston, in the county of Cook and State of Illinois, have invented certain new and useful Improvements in Gate-Valves, of which the following is a specification.

This invention has reference to an improved construction of gate valve which will seat tightly without an excess of pressure being apppplied thereto; which will release or open freely; which will make a good seat even if there should be some quantity of foreign material or dirt deposited in or around the parts, and which will not in continued operation be so liable to leakage as the type of gate valve ordinarily employed.

A further object of this invention is the provision of a device of the character specified, which can be cheaply constructed, and in which the facing material or seat proper may be renewed at a minimum cost when it has become worn.

The above as well as such other objects as may hereinafter appear, I attain by means of a construction which I have illustrated in preferred form in the accompanying drawings, wherein—

Figure 2:
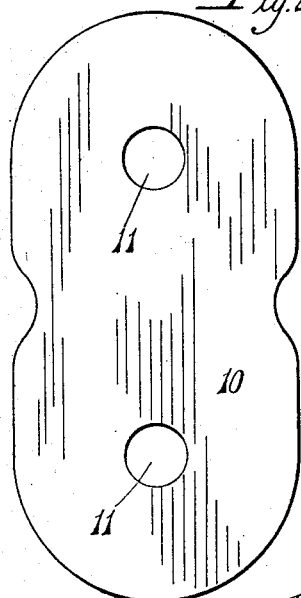
Figure 1:
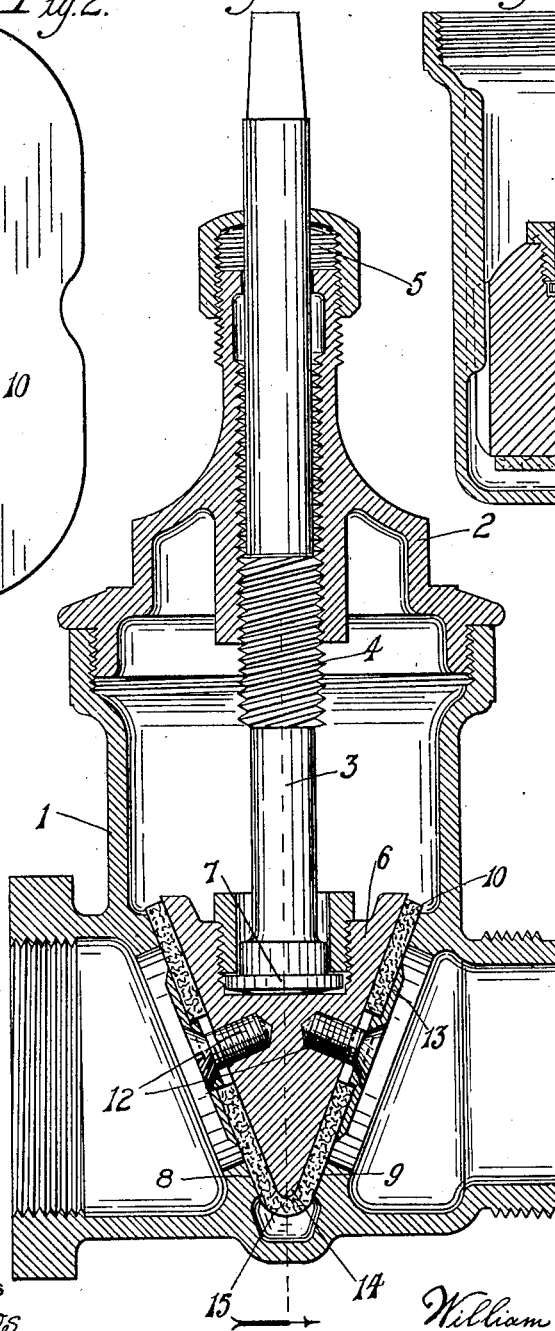
Figure 3:
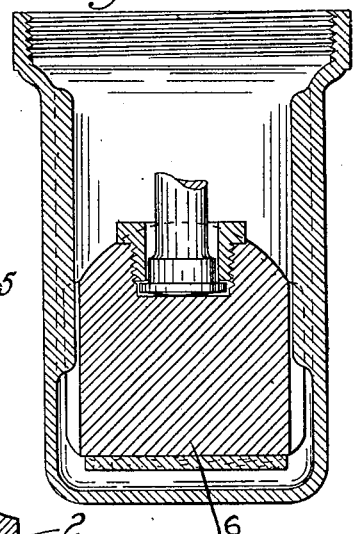

Figure 1 is a sectional view of a valve embodying my improvement, Figure 2 is a view of the elastic seat packing which I employ, and Figure 3 is a partial section taken at right angles to the section of Figure 1.

Referring particularly to Figure 1, it will be seen that I therein illustrate a valve body 1 having the usual threaded outlet and inlet connections and a bonnet 2 within which operates a valve stem 3 having the threads 4 engaging the bonnet and a stuffing box at 5; and at the lower end of the stem 3 I mount a gate or disk 6, by means of a swivel connection 7 arranged as shown, the gate being made of a large angle as indicated.

The seats 8 and 9 of the body of the valve are made of an angularity to correspond with the angle of the disk 6, and the wedge or disk is provided with a packing of some resilient material such as leather for example, indicated at 10, said packing being cut out of a shape substantially such as is indicated at Figure 2, with the apertures 11 through which pass the screws 12, while the flanges or plates 13 serve to hold the seat packing in place, the screws 12 passing through these plates 13.

It will be observed that at the lower end of the wedge it is rounded on a curvature indicated at 14, and that the leather or elastic seat 10 is bent around such rounded part 14, as is indicated at 15, the said elastic packing being made of sufficient width to extend clear across the width of the wedge or valve disk 6, whereby I insure a retention of the said member in place upon the wedge, as against any distortion that would be otherwise liable to occur from forcing said elastic packing down into a wedge shaped recess. It will also be seen from Figure 3 that the lower end of the gate 6 and the seat portion into which the end fits, extend transversely in a right line at right angles to the axes of the valve. The leather may be much more easily fitted over an end so formed than over one which is rounded transversely.

Having thus described my invention and illustrated its use, what I claim as new and desire to secure by Letters Patent is the following;—

1. A gate valve comprising in combination, a valve body, a wedge having its lower edge formed along substantially a right line, a leather packing strip having a portion intermediate its ends fitting around the end of the wedge, and clamping means for securing the ends of the strip to the wedge.

2. A gate valve comprising in combination, a valve body having a wedge shaped seat, a wedge adapted to coöperate with said seat, a leather packing strip comprising covering portions for the faces of the wedge and a connecting intermediate portion extending around the end of the wedge, and means for clamping the covering portions of the strip to the faces of the wedge with the edges of such portions free.

In testimony whereof, I have hereunto signed my name in the presence of the two subscribed witnesses.

WILLIAM W. DOOLITTLE.

Witnesses:
PAUL CARPENTER,
R. W. HICKS.